United States Patent [19]
Hedberg

[11] Patent Number: 6,037,798
[45] Date of Patent: Mar. 14, 2000

[54] LINE RECEIVER CIRCUIT HAVING TERMINATION IMPEDANCES WITH TRANSMISSION GATES CONNECTED IN PARALLEL

[75] Inventor: Mats Hedberg, Haninge, Sweden

[73] Assignee: Telefonaktiebolaget LM Ericsson, Stockholm, Sweden

[21] Appl. No.: 09/186,622

[22] Filed: Nov. 6, 1998

Related U.S. Application Data

[63] Continuation of application No. PCT/EP97/02351, May 7, 1997.

[30] Foreign Application Priority Data

May 8, 1996 [DE] Germany ............................ 196 18 527

[51] Int. Cl.[7] .......................... H03K 17/16; H03K 19/003
[52] U.S. Cl. ................................. 326/30; 326/83; 326/113
[58] Field of Search ................................ 326/30, 24, 83, 326/86, 113

[56] References Cited

U.S. PATENT DOCUMENTS

| | | | |
|---|---|---|---|
| 4,991,140 | 2/1991 | Wang et al. .............................. | 365/203 |
| 5,371,420 | 12/1994 | Nakao ....................................... | 326/27 |
| 5,396,028 | 3/1995 | Tomassetti ................................. | 178/69 |
| 5,528,168 | 6/1996 | Kleveland .................................. | 326/30 |
| 5,530,377 | 6/1996 | Walls ......................................... | 326/30 |
| 5,559,448 | 9/1996 | Koenig ...................................... | 326/30 |
| 5,570,037 | 10/1996 | Llorens ...................................... | 326/30 |

FOREIGN PATENT DOCUMENTS

| | | | |
|---|---|---|---|
| 0632392 | 1/1995 | European Pat. Off. ................... | 13/40 |
| 2282035 | 3/1995 | United Kingdom ....................... | 12/40 |
| WO95/24089 | 9/1995 | WIPO . | |

OTHER PUBLICATIONS

"On–chip Programmable Termination Scheme" IBM Technical Disclosure Bulletin, vol. 38, No. 2, Feb. 1995, New York US, pp. 483–485.

Primary Examiner—Michael Tokar
Assistant Examiner—Daniel Chang
Attorney, Agent, or Firm—Burns, Doane, Swecker & Mathis, L.L.P.

[57] ABSTRACT

A line receiver circuit featuring an integrated input amplifier circuit having a non-inverting input terminal and an inverting input terminal for connection with a transmission line. The circuit features a line termination impedance means for terminating the characteristic impedance of the transmission line with the input amplifier circuit and the line termination impedance means integrated on a common semiconductor substrate. The line termination impedance means features a series connection of a plurality of impedances where at least one of the impedances has a transmission gate connected in parallel. The transmission gates feature a parallel connection of an N-channel MOSFET and a P-channel MOSFET where the gate of the N-channel MOSFET is connected to receive a transmission control signal, and the gate of the P-channel MOSFET is connected to receive the inverted transmission control signal.

14 Claims, 3 Drawing Sheets

LINE RECEIVER CIRCUIT HAVING TERMINATION IMPEDANCES WITH TRANSMISSION GATES CONNECTED IN PARALLEL

This application is a continuation application of International Application Number PCT/EP97/02351, which was filed on May 7, 1997, which designated the United States, and which is expressly incorporated here by reference.

This application claims priority under 35 U.S.C. §§119 and/or 365 to 196 18 527.0 filed in Germany on May 8, 1996; the entire content of which is hereby incorporated by reference.

The present invention concerns a line receiver circuit that can be electrically connected to a transmission line, for receiving information transmitted via the transmission line in the form of digital electrical signals. A line receiver circuit according to the preamble of claim 1 is known from IBM Technical Disclosure Bulletin, vol. 38, no. 2, February 1995, Armonte US, pages 483–485.

At present, a variety of concepts for digital logic circuits and digital signalling between circuits is known.

Early concepts are DTL (Diode-Transistor Logic), TTL (Transistor-Transistor Logic) and ECL (Emitter Coupled Logic), which concepts are used within digital logic circuits as well as for digital signalling between circuits or circuit boards.

Concepts designed for transmission of digital data with a high data rate preferably employ differential transmission and reception of digital data, using a pair of signalling wires. DPECL (Differential Positive Emitter Coupled Logic), LVDS (Low Voltage Differential Signalling) and GLVDS (Grounded Low Voltage Differential Signalling) are examples of signalling concepts which use differential signalling. Differential signalling enables keeping the differential voltage across the pair of signalling wires low as due to the differential concept spurious voltage drops across a ground line connecting the transmitter with the receiver will not adversely affect the quality of data transmission. Low differential signalling voltages in turn keep the power transmitted over low impedance transmission lines within reasonable limits.

With the ever increasing complexity of digital circuitry along with a rapid increase of the scale of integration and operating speed, the number of signal channels between respective circuit components and accordingly, the pin number of the integrated circuits increases correspondingly. Space on the surface of printed circuits boards for accommodating components and wiring between the components and/or the periphery is precious and rare.

Moreover, for a variety of different reasons a complex system often employs different signalling schemes for different parts. When considering all differential signalling concepts presently available, signalling voltages span from slightly below 0 volt up to more than 4 volt. As a consequence, it is not possible to connect an output of a circuit conforming to one particular differential signalling concept with the input of another circuit conforming to a different signalling concept. Accordingly, a complex circuit design must either stick to a specific signalling concept or must include means for translating between the different signalling levels. The first alternative has the drawback that future developments lack flexibility while the latter alternative requires additional space and power not related to the core functions of the system.

From U.S. Pat. No. 5,396,028 an apparatus for transmission line termination is known. According to this document, transmission line termination is achieved by means of a transmission gate consisting of a PMOS transistor an a NMOS Transistor each having a resistor connected in series. The resulting structures are connected in parallel. The transmission gate is used for adjusting the termination impedance across the two transmission line conductors in an analog fashion. To this end a precision resistance control circuit is required.

The present invention aims at solving the above mentioned problems. It is the object of the invention, to make digital high speed signalling as simple, space and cost efficient as possible.

This object is solved as defined in claim 1. Embodiments of the invention are defined in the dependent claims.

According to the present invention, it is the integrated line receiver circuit that does not only perform the regeneration of the signals received via the transmission line but also provides for proper termination of the transmission line by means of including termination impedance means on the chip of the integrated line receiver circuit. Of course, the integrated line receiver circuit including the integrated termination impedance means can be integrated on the same chip as other circuitry dedicated to processing the received information.

The line receiver circuit according to the present invention allows connecting the transmission line directly to the input pins of an integrated circuit receiving data via the transmission line, without the need of providing for proper termination of the transmission line. Accordingly, no extra space on the printed circuit board is required for components terminating the transmission line. In this way it is possible to connect a large number of signal channels to a large number of input pins in a space and cost efficient way. The present invention makes use of the fact that modern digital differential signalling concepts employ low signalling voltage differences in the range of e.g. 0,2 Volt such that the termination impedances do not dissipate much power and hence can be integrated on the semiconductor substrate of the line receiver circuit without occupying much space. Integrating the line termination impedance means and the input amplifier on the same chip has the additional advantage that spurious resonances that might arise from a series connection of inductive components of bond wires and the capacitances of the input terminals of amplifier, can be damped very efficiently such that the stability of the whole circuit design is improved.

In order to avoid that means for translating between different signalling levels are necessary in mixed systems employing a variety of different digital signalling schemes, the termination means connected across the input terminals of the input amplifier circuit can be kept floating, i.e. do not require a predetermined common mode voltage for proper operation but are able to operate over a sufficiently large common mode voltage range, e.g. slightly below ground level up to slightly above the level of the power supply voltage of the line receiver circuit. If the input amplifier circuit is provided with a correspondingly large common mode voltage range, the line receiver circuits can be connected to any sender and will work properly as long as the common mode voltage on the transmission line, as far as determined by the sender, is within the common mode operating voltage range of the input amplifier circuit and the termination impedance means.

Moreover, in order to cope with different characteristic impedances of transmission lines, the line receiver circuit includes a plurality of impedance circuits and at least one transmission gate circuit controllable to be in a low impedance transmission state or a high impedance blocking state, said plurality of impedance circuits and said at least one transmission gate circuit being interconnected such that an impedance value of said line termination impedance means can be controlled by means of controlling said at least one transmission gate circuit. The termination impedance means comprises a plurality of impedance means connected in series, each impedance means having a transmission gate connected in parallel such that by appropriately selecting a transmission state or blocking state of each of these transmission gates, the overall impedance of the series circuit can be adjusted according to need. The termination impedance means is advantageous in that an unwanted capacitance resulting from the termination means can be kept small.

The transmission state of each transmission gate can be controlled via a respective control terminal for each transmission gate. If a plurality of similar line receiver circuits for a plurality of signal channels is provided on a common semiconductor chip, the corresponding control terminals of corresponding transmission gate circuits can be connected together. The control terminals of the line receiver circuit can be connected to dedicated input configuration pins or can be driven by a logic circuit that exclude useless or destructive combinations of transmission states of the transmission gates of each line receiver circuit.

In the following, embodiments of the present invention will be described in greater detail with reference to the accompanying drawings.

Figure 1:
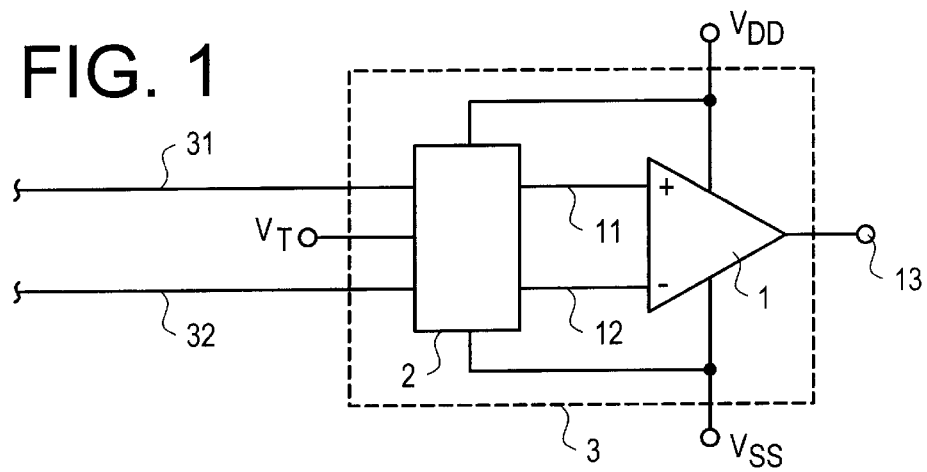
FIG. 1 shows an overall block diagram of an embodiment of a line receiver circuit according to the present invention.

FIG. 1 shows an overall block diagram of an embodiment of a line receiver circuit according to the present invention. In this diagram, reference numeral 1 designates a differential input amplifier circuit having a non-inverting input terminal 11 and an inverting input terminal 12. A voltage difference across the input terminals 11 and 12 is amplified by the amplifier 1 in a linear or non-linear fashion and the amplified signal appears at output terminal 13 of the amplifier 1. Reference numeral 2 designates line termination impedance means connected across the input terminals 11 and 12 of amplifier 1. Conductors 31 and 32 constitute a transmission line which is driven by a data transmitter (not shown) and connected to the input terminals 11 and 12 of amplifier 1. The dashed box around input amplifier 1 and line termination imp-dance means 2 indicates that both the input amplifier circuit 1 as well as the line termination impedance means 2 are integrated on a common semiconductor substrate, i.e. that both the input amplifier 1 and the line termination impedance means 2 are components of the same integrated circuit. Of course, in addition to the elements shown inside the dashed box in FIG. 1, other elements can be provided on the integrated circuit, e.g. additional input amplifiers and line termination means for additional signal channels and other circuitry for processing the information received via each of the transmission lines connected to the integrated circuit.

Terminals VDD and VSS in FIG. 1 denote the power supply terminals for the input amplifier circuit 1. While the line termination impedance means 2 in FIG. 1 is shown to receive a power supply voltage across VDD and VSS, such connection of the line termination impedance means 2 to VDD and VSS might not be necessary depending on the particular embodiment of the line termination impedance means 2.

In its most basic form the line termination impedance means 2 is a resistor the resistance of which is selected in accordance with the characteristic impedance of transmission line 31, 32.

According to another basic embodiment the line termination impedance means 2, provides for common mode termination of each signal conductor with one termination impedance for each of the conductors 31 and 32 of the transmission line. In this case the respective impedances are connected to VDD or VSS or to terminal VT, depending on the kind of termination expected by the transmitter. If each of the termination impedances is connected to the terminal VT, the application of an external voltage to this terminal enables a common mode termination of the conductors 31, 32 of the transmission line at an arbitrary potential which can be determined depending on the employed kind of transmitter.

Figure 2:
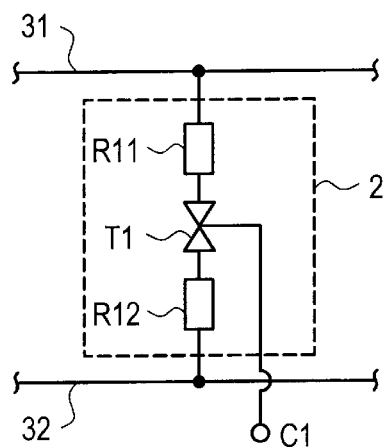
FIG. 2 shows a first embodiment of a line termination impedance means.

FIG. 2 shows a first embodiment of line impedance termination means 2. According to this embodiment, line impedance termination means 2 comprises a series connection of a first impedance R11, a transmission gate T1 and a second impedance R12, this series connection being connected across the input terminals 11 and 12 of the input amplifier circuit 1. In this embodiment, 31 and 32 denote the conductors of a symmetrical transmission line, (e.g. twisted pair or similar types of transmission lines), which is terminated by said series connection of R11, T1 and R12. In view of the symmetrical nature of the transmission line, impedances R11 and R12 preferably have the same impedance value. C1 denotes a control terminal of transmission gate T1. By means of applying an appropriate control voltage to control terminal C1, transmission gate T1 takes a low impedance transmission state, i.e. connects impedances R11 and R12 substantially like a short circuit, or takes a high impedance blocking state, i.e. substantially disconnects R11 and R12.

Accordingly, by means of transmission gate T1, the first embodiment of the present invention allows switching on or off the internal termination essentially constituted by R11 and R12 connected in series. In this way, the line receiver circuit of the present invention according to this embodiment can be configured to operate on a dedicated transmission line or can be configured to operate on a data bus transmission line. In the first case the transmission gate is controlled to take the low impedance transmission state while in the latter case the transmission gate is controlled to take the high impedance blocking state.

Although not shown in FIG. 2, by means of providing a plurality of series circuits each consisting of a first impedance, a transmission gate and a second impedance as depicted in FIG. 2, all series circuits being connected in parallel across input terminals 11 and 12 of amplifier 1, it is possible to configure the termination impedance across the input terminals 11 and 12 of the input amplifier 1 to match different characteristic impedances of transmission line 31, 32. In this case, the transmission gates T1 of each series circuit allow selecting particular series connections of impedances R11, R12 to be connected in parallel such that the resulting impedance of this parallel connection is adjustable according to need.

Figure 3:
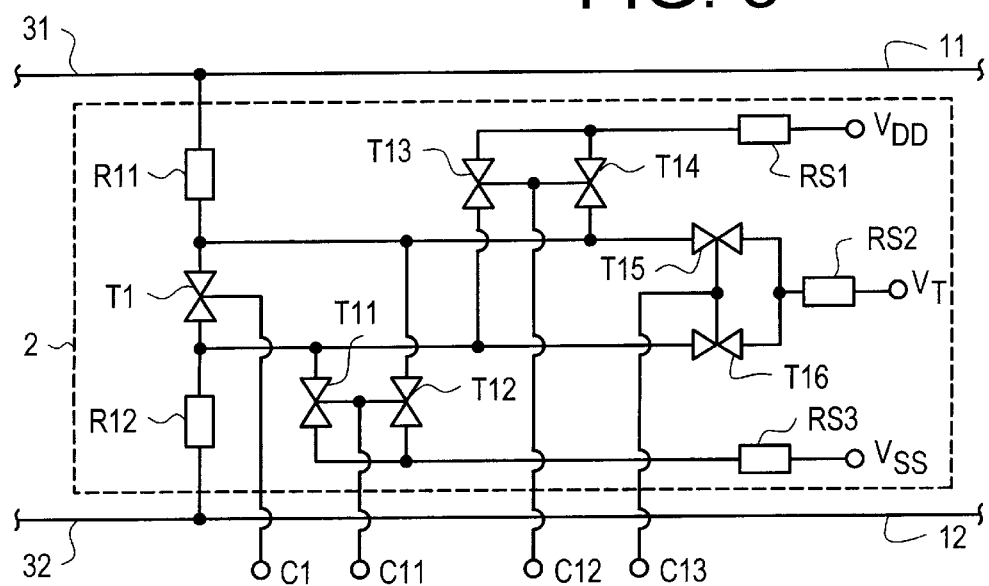
FIG. 3 shows a second embodiment of a line termination impedance means of the present invention.

FIG. 3 shows a second embodiment of a line termination impedance means according to the present invention. Similar to the embodiment depicted in FIG. 2, also the second embodiment comprises a series connection of a first impedance R11, a transmission gate T1 and a second impedance R12, this series circuit being connected across the input terminals 11 and 12 of input amplifier 1. Reference numerals 31 and 32 again denote the conductors of a transmission line connected to the input terminals 11 and 12 of amplifier 1. In addition to the elements shown in FIG. 2, the second embodiment comprises a first pair of transmission gates T11, T12, a second pair of transmission gates T13, T14 and a third pair of transmission gates T15, T16. C11 denotes a control terminal for controlling the transmission state of the transmission gates T11 and T12. C12 denotes a control terminal for controlling state of transmission gates T13 and T14, and C13 denotes a control terminal for controlling the transmission state of transmission gates T15 and T16. The transmission gates belonging to the same pair always take the same transmission state determined by the signal applied to the corresponding control terminal.

The first transmission gate T11 of the first pair is connected between that terminal of impedance R12 which is connected to transmission gate T1, and the negative power supply terminal VSS. The second transmission gate T12 of the first pair is connected between that terminal R11 which is connected to transmission gate T1 and terminal VSS. The first transmission gate T13 of the second pair of transmission gates is connected to that terminal of impedance R12 which is connected to transmission gate T1 and the positive power supply VDD. The second transmission gate T14 of the second pair of transmission gates is connected between that terminal of impedance R11 which is connected with transmission gate T1 and power supply terminal VDD. The first transmission gate T15 of the third pair of transmission gates is connected between that terminal of impedance R11 that is connected to transmission gate T1, and a terminal VT for applying an external voltage potential. The second transmission gate T16 of the third pair is connected between that terminal of impedance R12 that is connected to transmission gate T1 and terminal VT.

The second embodiment allows that the line impedance termination means can be configured to terminate a variety of different types of transmission lines. Depending on the control signals applied to control terminals C1, C11, C12 and C13, it is possible to configure the line receiver circuit incorporating the line termination impedance means of the second embodiment for terminating a symmetrical transmission line, and/or for providing a common mode termination of each of the conductors 31, 32 of the transmission line to the positive power supply potential VDD, or to the negative power supply potential VSS or to an arbitrary termination voltage applied to terminal VT. Also, this embodiment allows that no termination of the transmission line takes place at all.

For terminating a symmetrical transmission line, transmission gate T1 is controlled to be in a low impedance transmission state while all other transmission gates depicted in FIG. 3 are controlled to be in a high impedance blocking state. For providing a common mode termination of the conductors 31, 32 with respect to the positive power supply potential VDD, transmission gates T13 and T14 are controlled to take a low impedance transmission state while all other transmission gates depicted in FIG. 3 are controlled to take a high impedance blocking state.

If a common mode termination of conductors 31, 32 with respect to the negative power supply potential VSS is required, transmission gates T11 and T12 are controlled to take a low impedance transmission state while all other transmission gates depicted in FIG. 3 are controlled to take a high impedance blocking state. If a common mode termination of conductors 31, 32 with respect to a voltage potential different from VDD or VSS is desired, a voltage source providing an appropriate voltage level is connected between terminal VT and e.g. VSS, and all transmission gates except T15 and T16 are controlled to take a high impedance blocking state while T15 and T16 are controlled to take a low impedance transmission state.

If a symmetrical termination of conductors 31, 32 and at the same time, a common mode termination of conductors 31, 32 is desired, i.e. if a Y-type termination of the transmission line is desired, transmission gate T1 may be controlled to be in a low impedance transmission state and at the same time, in case that a common mode termination to VDD is desired, transmission gates T13 and T14 can be controlled to be in a low impedance transmission state. Similarly, if a Y-type termination with respect to VT is desired, transmission gates T1, T15 and T16 are controlled to take a low impedance transmission state while all other transmission gates are in a blocking state. If a Y-termination with respect VSS is desired, transmission gates T1, T11 and T12 are in a low impedance state while all other transmission gates are in a blocking state. For each kind of Y-termination, an additional impedance RS1, RS2, RS3 can be provided acting as source impedance for the common mode termination voltage, as shown in FIG. 3. Of course, an Y-type termination of transmission lines 31 and 32 can also be obtained with transmission gate T1 being in a blocking state. In this case, however, the current driving ability of transmission gates T11 to T16 would have to be higher, and accordingly, the size of these transmission gates would have to be larger than in the case, that for a Y-type termination also transmission gate T1 is controlled to take a low impedance transmission state.

Figure 4:
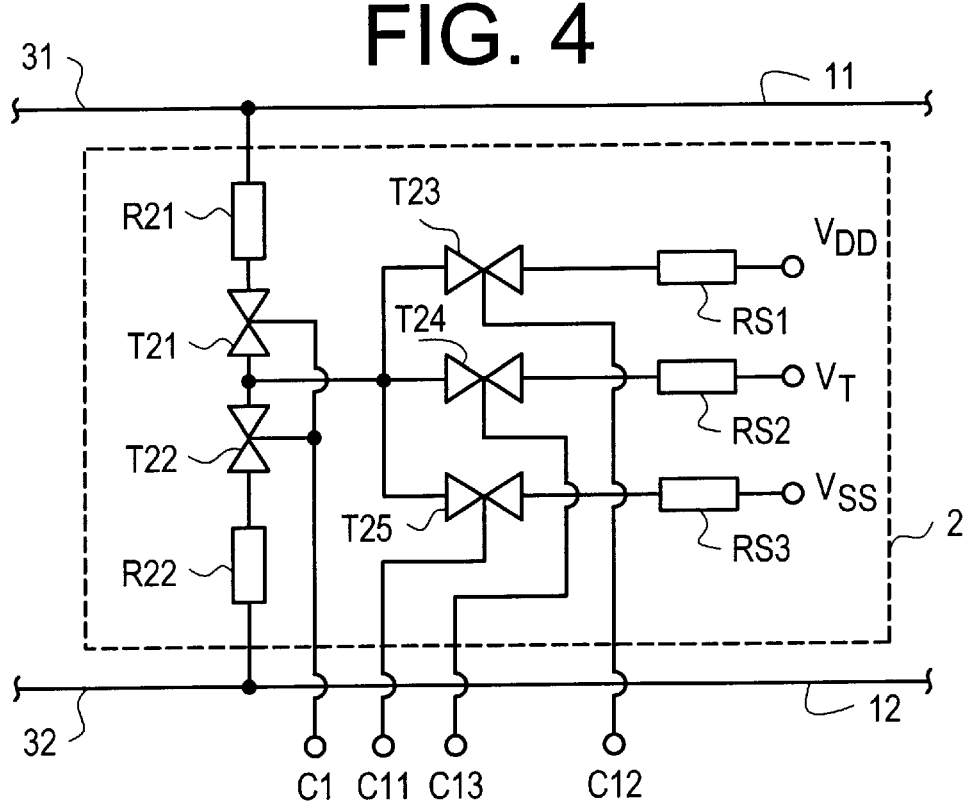
FIG. 4 shows a third embodiment of a line termination impedance means of the present invention.

FIG. 4 depicts a third embodiment of a line termination impedance means according to the present invention. This embodiment differs from the embodiment shown in FIG. 3 in that instead of a single transmission gate T1 connected between impedances R11 and R12, a series connection of two transmission gates T21 and T22 is connected between impedances R21 and R22. Moreover, in place of the pair of transmission gates T11, T12 a single transmission gate T25 is provided. In place of a pair of transmission gates T13, T14 a single transmission gate T23 is provided. In place of a pair of transmission gates T15, T16 a single transmission gate T24 is provided. Each of transmission gates T23 to T25 has one of its transmission terminals connected to that transmission terminal of T21 which is connected to a transmission terminal of T22, as shown in the figure. Operation and control of the third embodiment are similar to what has been described with regard to the second embodiment.

Regarding the first, second and the third embodiment it is to be noted, that both the impedances R11, R12, R21 and R22 and the impedances RS1, RS2, RS3 need not be present as separate components on the semiconductor chip but can be effected by means of designing the respective transmission gates such that in their respective low impedance transmission states they have a desired transmission impedance. When using field effect transistors for designing the transmission gates, the desired transmission impedance can e.g. be obtained by suitably designing the channel geometry.

If no termination of transmission line 31, 32 by the line termination impedance means 2 is desired, all transmission gates depicted in FIGS. 2, 3 or 4 are switched into a high impedance blocking state. In order to lower the capacitive load on transmission lines 31 and 32, additional transmission gates (not shown in the Figures) can be provided between amplifier input terminal 11 and first impedance R21 or R22 and furthermore between second impedance R12 or R22 and amplifier input terminal 12. These additional transmission gates can be controlled such that if no termination is desired, these additional transmission gates (not shown) take the high impedance blocking state and otherwise the low impedance transmission state.

Figure 5:
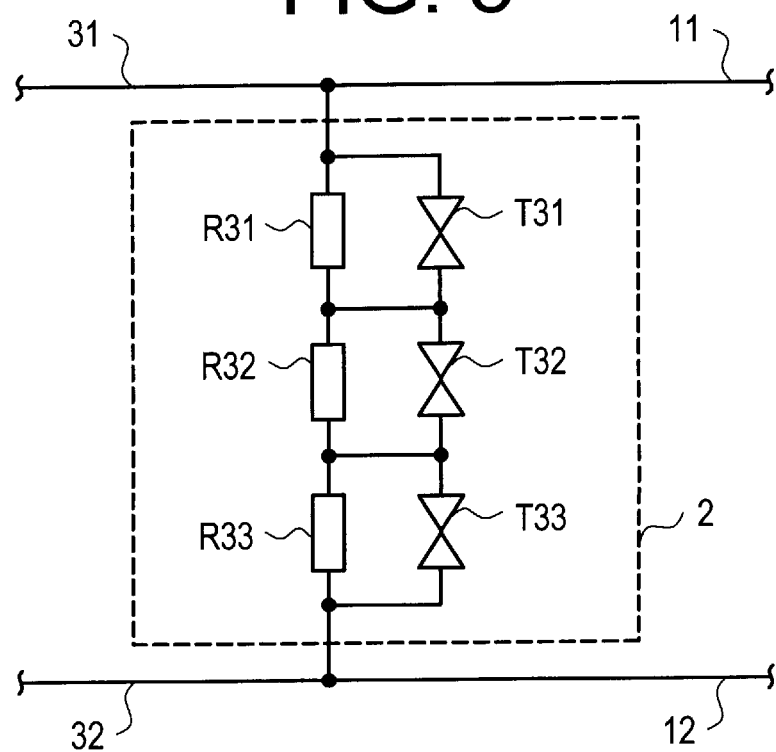
FIG. 5 shows a fourth embodiment of a line termination impedance means of the present invention.

FIG. 5 shows a fourth embodiment of a line termination impedance means according to the present invention. According to this embodiment, a series connection of three impedances R31, R32 and R33 is provided. Each of these impedances has a transmission gate T31, T32 and T33, respectively, connected in parallel. For reasons of simplicity the control terminals of T31 to T33 are not shown in FIG. 5. This embodiment allows adjusting the line termination impedance between conductors 31 and 32 of the transmission line by means of shorting out selected impedances among the plurality of impedances R31 to R33 connected in series. Similar to the previous embodiments additional transmission gates (not shown) may be provided between amplifier input terminal 11 and said series connection and between amplifier input terminal 12 and said series connection, in order to allow for disconnection of the entire line termination impedance means 2 if desired.

In order to allow for Y-type termination, a modification of the line impedance termination means of FIG. 5 has the central transmission gate T32 replaced by a line termination impedance circuit 2 shown in FIG. 3 or by a line termination impedance circuit shown in FIG. 4.

By means of connecting a plurality of circuits examples of which are described in connection with FIGS. 2, 3, 4 and 5, in parallel and across the input terminals 11 and 12 of amplifier 1, it is possible to configure the termination impedance across the input terminals 11 and 12 of the input amplifier 1 and the common mode termination impedances across each of the input terminals 11, 12 and the desired termination potential, respectively, to match different characteristic impedances of the employed transmission line 31, 32. By means of appropriately selecting the transmission state of the transmission gates available in the circuit resulting from said parallel connection, the value of the symmetrical termination impedance and/or the value of the respective common mode termination impedances can be adjusted according to need by means of effectively connecting an appropriate number of impedances in parallel. If a plurality of circuits according to any of the embodiments previously described are connected in parallel, it might be advisable to provide additional transmission gates in series with this parallel connection at both ends of this parallel connection in order to reduce the capacitive load on the transmission line 31, 32 by means of switching these additional transmission gates in a high impedance blocking state if no termination across lines 31, 32 is desired or required.

Control terminals C1 and C11, C12, C13 of each line impedance termination means 2 can be embodied as input configuration pins of the integrated circuit including the line receiver circuit of the present invention. Alternatively and more preferably, a logic circuit can be provided for driving control terminals C1, C11, C12, C13 depending on the logical state of input terminals of the logic circuit such that erroneous combinations of transmission states of the transmission gates of the respective pairs of transmission gates are excluded. In this way, the number of configuration pins required for setting up the line termination impedance means 2 can be reduced and a destruction of the integrated circuit due to malconfiguration can be avoided. This logic circuit can also control said additional transmission gates not shown in the Figures, if provided.

The logic circuit may receive binary information on the termination value and binary information on the termination type. Termination types may include no termination, i.e. very high termination impedance values approximating infinity, floating parallel (symmetrical) termination, common mode termination to VSS, VT or VDD and Y-termination to VSS, VT or VDD.

As an alternative to controlling said logic circuit via external control terminals for inputting information on the termination impedance values and the termination type, it is possible to program the transmission state of each of the transmission gates when designing or manufacturing an integrated circuit including a line receiver circuit according to the present invention. Programming can take place by means of fuses, laser burning, mask programming etc.

Moreover, a control circuit can be provided for actively adjusting the termination impedance to a desired value, to compensate for Processing variations and/or temperature variations and/or power supply variations. For this purpose, the active control circuit may include an external reference resistor.

Figure 6A:
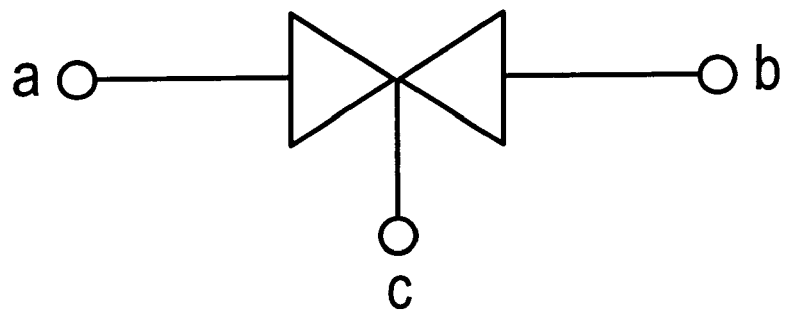
FIG. 6a shows the symbol used for depicting a transmission gate.
Figure 6B:
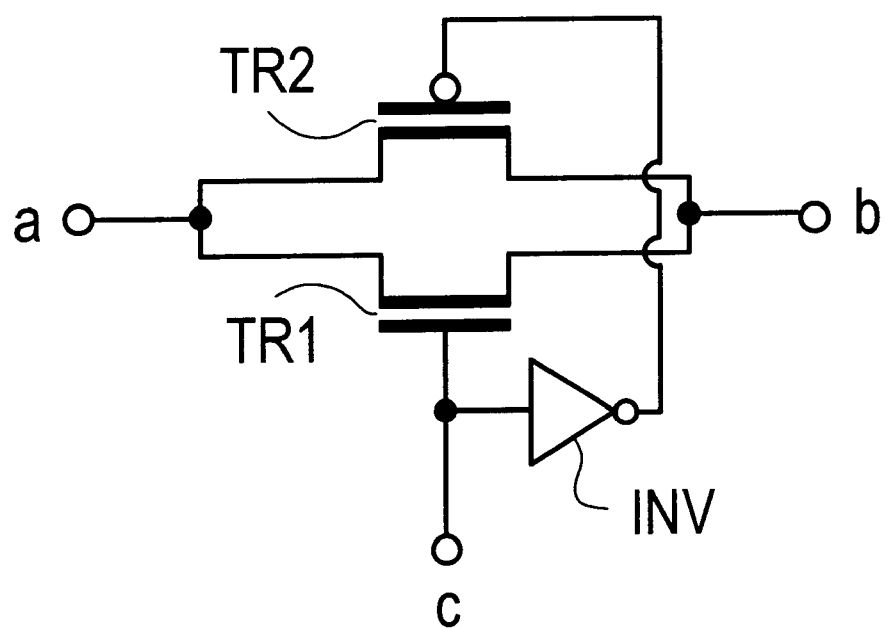
FIG. 6b shows a schematic diagram of an embodiment of a transmission gate according to the invention.

FIG. 6a shows the symbol used for depicting a transmission gate of the present invention. A transmission gate comprises two transmission terminals a, b as well as a control terminal c. Depending on the signal applied to control terminal c, with respect to terminals a and b the transmission gate takes a low impedance transmission state or a high impedance blocking state. FIG. 6b shows an embodiment of the transmission gate of FIG. 6a. According to this embodiment the transmission gate comprises an NMOS transistor TR1 as well as a PMOS transistor TR2, the channels of the NMOS transistor TR1 and the PMOS transistor TR2 being connected in parallel between terminals a and b of the transmission gate. INV denotes an inverter the output of which is connected with the gate of PMOS transistor TR2. A control voltage at terminal c is applied to the gate of NMOS transistor TR1 as well as to the input of inverter INV.

If the voltage applied to control terminal c is low, at or close to potential VSS, NMOS transistor TR1 is in a nonconducting state as long as neither the potential of terminal a nor the potential of terminal b is lower than the potential of terminal c minus the threshold voltage of TR1. Moreover, the gate of PMOS transistor TR2 is at high potential (on or close to VDD) due to the action of inverter INV, such that also this transistor TR2 will be in a nonconducting state as long as neither the potential of terminal a nor the potential of terminal b rises above the gate potential of TR2 plus the threshold voltage of TR2. Accordingly, if terminal c is kept low the circuit depicted in FIG. 6b will maintain a non-conducting high impedance state between terminals a and b as long as the potentials of terminals a and b remain within the limits just mentioned.

If the potential at terminal c is raised up to VDD or close to VDD, the gate of NMOS transistor TR1 receives high potential while due to the inverter INV the gate of PMOS transistor TR2 receives low voltage. Accordingly, NMOS transistor TR1 will conduct as long as that terminal of terminals a, b which has the lower potential, has a potential lower than the potential at control terminal c by the threshold voltage of TR1. PMOS transistor TR2 takes a conducting state as long as the higher potential of the potentials at terminals a, b is by the threshold voltage of TR2 higher than the gate voltage of PMOS transistor TR2 which is at or close to VSS. Accordingly, if a high potential is applied to control terminal c, the circuit of FIG. 6b takes a low impedance transmission state between terminals a and b regardless the potential at terminals a and b, this rendering the circuit of FIG. 6b suitable for floating operation.

I claim:

1. Line receiver circuit, comprising
an integrated input amplifier circuit (1) having a non-inverting input terminal (11) and an inverting input terminal (12) for connection with a transmission line (31, 32);
line termination impedance means (2) for terminating the characteristic impedance of said transmission line (31, 32);
wherein the input amplifier circuit (1) and said line termination impedance means (2) are integrated on a common semiconductor substrate; characterized by
said line termination impedance means (2) comprising a series connection of a plurality of impedances (R31, R32, R33);
at least one of said impedances (R31, R32, R33) having a transmission gate (T31, T32, T33) connected in parallel;
each transmission gate comprising a parallel connection of an N-channel MOSFET (TR1) and a P-channel MOSFET (TR2);
the gate of said N-channel MOSFET (TRI) being connected to receive a transmission control signal (C1) and the gate of said P-channel MOSFET (TR2) being connected to receive said inverted transmission control signal.

2. Line receiver circuit according to claim 1, comprising a plurality of line termination impedance means (2) connected in parallel between said input terminals (11, 12) of said input amplifier circuit (1).

3. Line receiver circuit according to claim 1, wherein said line termination impedance means (2) comprises
a series connection of an impedance circuit (R11, R12) and a first transmission gate circuit (T1);
said series connection being connected across said input terminals (11, 12) of said input amplifier circuit (1).

4. Line receiver circuit according to claim 3, wherein said series connection comprises
a first impedance (R11; R21; R31) having one of its terminals connected with one (11) of the input terminals of said input amplifier circuit and having its other terminal connected to one terminal of said first transmission gate circuit;
a second impedance having one of its terminals connected with the other input terminal (12) of said input amplifier circuit (1) and having its other terminal connected to the other terminal of said first transmission gate circuit.

5. Line receiver circuit according to claim 4, wherein said line termination impedance means (2) comprises
a second transmission gate circuit (T12;T14) connected between said one terminal of said first transmission gate circuit (T1) and one (VDD;VSS) of the power supply terminals of the line receiver circuit; and
a third transmission gate circuit (T13;T11) connected between said other terminal of said first transmission gate circuit (T1) and said one (VDD;VSS) of the power supply terminals of the line receiver circuit.

6. Line receiver circuit according to claim 5, wherein said line termination impedance means comprises
a fourth transmission gate circuit (T15) connected between said one terminal of said first transmission gate circuit (T1) and a terminal (VT) for applying an external termination voltage; and
a fifth transmission gate circuit (T16) connected between said other terminal of said first transmission gate circuit (T1) and said terminal (VT) for applying an external termination voltage.

7. Line receiver circuit according to claim 6, wherein said line termination impedance means (2) comprises
a series connection of a third impedance (R21), a sixth transmission gate (T21), a seventh transmission gate (T22) and a fourth impedance (R22); and
an eighth transmission gate (T23, T25), one of its transmission terminals being connected with said sixth transmission gate (T21) and said seventh transmission gate (T22), the other of its transmission terminals being connected to one of the power supply terminals (VSS, VDD) of the line receiver circuit.

8. Line receiver circuit according to claim 7, wherein said line termination impedance means (2) comprises
a ninth transmission gate (T24), one of its transmission terminals being connected with said sixth transmission gate (T21) and said seventh transmission gate (T22), the other of its transmission terminals being connected to a terminal (VT) for applying an external termination voltage.

9. Line receiver circuit according to claim 2, wherein said line termination impedance means (2) comprises
a series connection of a plurality of impedances (R31, R32, R33);
at least one of said impedances (R31, R32, R33) having a transmission gate (T31, T32, T33) connected in parallel.

10. Line receiver circuit according to claim 3, wherein each transmission gate circuit (T1) comprises a parallel connection of an N-channel MOSFET (TR1) and a P-channel MOSFET (TR2);
the gate of said N-channel MOSFET (TR1) being connected to receive a transmission control signal (C1) and the gate of said P-channel MOSFET (TR2) being connected to receive said inverted transmission control signal.

11. Line receiver circuit according to claim 10 comprising
a plurality of line termination impedance means (2) connected in parallel between said input terminals (11, 12) of said input amplifier circuit (1).

12. Line receiver circuit according to claim 4, wherein said line termination impedance means comprises
a second transmission gate circuit (T15) connected between said one terminal of said first transmission gate circuit (T1) and a terminal (VT) for applying an external termination voltage; and
a third transmission gate circuit (T16) connected between said other terminal of said first transmission gate circuit (T1) and said terminal (VT) for applying an external termination voltage.

13. Line receiver circuit according to claim 2, wherein said line termination impedance means (2) comprises
a series connection of a first impedance (R21), a first transmission gate (T21), a second transmission gate (T22) and a second impedance (R22); and an third transmission gate (T23, T25), one of its transmission terminals being connected with said first transmission gate (T21) and said second transmission gate (T22), the other of its transmission terminals being connected to one of the power supply terminals (VSS, VDD) of the line receiver circuit.

14. Line receiver circuit according to claim 13, wherein said line termination impedance means (2) comprises a fourth transmission gate (T24), one of its transmission terminals being connected with said first transmission gate (T21) and said second transmission gate (T22), the other of its transmission terminals being connected to a terminal (VT) for applying an external termination voltage.

* * * * *